H. C. & J. R. STILL.

SADDLE TREE.

No. 10,162. Reissued July 18, 1882.

WITNESSES:

W. W. Hollingsworth

W. Read

INVENTOR:

H. C. Still

J. R. Still

BY Munn & Co.

ATTORNEYS.

N. PETERS, Photo-Lithographer, Washington, D. C.

UNITED STATES PATENT OFFICE.

HENRY C. STILL AND JOSEPH R. STILL, OF AUSTIN, TEXAS.

SADDLE-TREE.

SPECIFICATION forming part of Reissued Letters Patent No. 10,162, dated July 18, 1882.

Original No. 195,415, dated September 18, 1877. Application for reissue filed April 19, 1882.

*To all whom it may concern:*

Be it known that we, HENRY C. STILL and JOSEPH R. STILL, of Austin, in the county of Travis and State of Texas, have invented a new and Improved Saddle-Tree Fork; and we do hereby declare that the following is a full, clear, and exact description of the same, reference being had to the accompanying drawings, forming part of this specification, in which—

Figure 1:
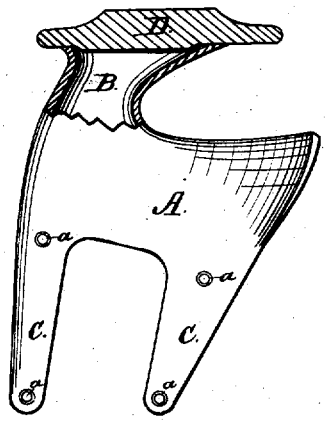
Figure 2:
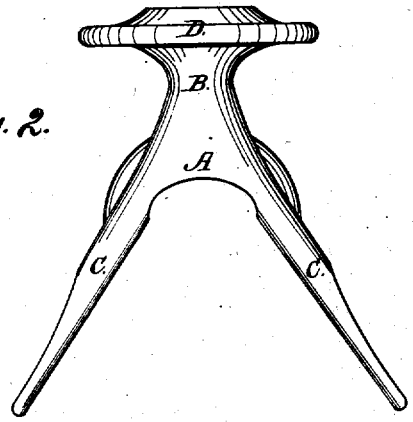

Figure 1 is a side view of the saddle-tree fork with pommel in section; Fig. 2, an end view.

Our invention relates to an improvement in riding-saddles, designed to secure greater strength in the pommel and fork; and it consists in forming the fork of the saddle-tree and the pommel from malleable cast-iron and in one and the same piece, the neck of the pommel being cast hollow for greater lightness, with the upper end of the casting open, which opening is closed by a surmounting cap of wood or other material, which finishes the pommel, as hereinafter more fully described.

In the drawings, A represents the saddle-tree fork, which, together with the pommel B and the extensions C C, is formed light of malleable cast-iron, the whole being cast in one piece. The extensions C are duplicated and arranged some distance apart for greater strength of attachment, and are provided with holes *a*, through which nails are driven or screws inserted to secure the fork to the saddle-tree. In casting the pommel with the fork the neck portion of the pommel is left hollow, and its upper opened end is flared outwardly, and upon this flared edge is located a cap-piece, D, made of any suitable material, which cap-piece completes the pommel, and at the same time closes the upper end of the casting.

We are aware that it is not new to form the pommel and fork of a riding-saddle in one and the same piece, and do not claim this broadly. By forming the pommel from malleable iron, however, and in one and the same piece with the fork we secure about three times the strength of the wooden pommel and fork, while by casting the pommel hollow and with an open upper end we preserve an equal degree of lightness, the pommel being afterward surmounted and completed by the separate cap-piece D.

From this description it will be seen that our invention provides a cheaper and more durable construction of saddle, and one that is admirably adapted to the strains of the lasso in lassoing or roping wild cattle.

After the fork is applied to the tree in the construction of the saddle the space between the extensions C is filled up with wood flush to the outer surface of the metal, and the whole is then covered with rawhide.

Having thus described our invention, what we claim as new is—

1. The fork A, provided with the hollow pommel B, cast in one piece with the fork, substantially as herein shown and described.

2. The fork A, having the hollow pommel B cast in one piece with the fork, and provided with a cap, D, secured to the upper end of the hollow pommel, substantially as herein shown and described.

3. The saddle-tree fork, substantially as specified, having fork A and hollow neck B formed in one piece from cast metal, and removable cap D, substantially as described, and for the purpose set forth.

HENRY CLAY STILL.
JOSEPH ROBERT STILL.

Witnesses:
JNO. W. ROBERTSON,
A. P. WOOLDRIDGE.